United States Patent [19]

Lees et al.

[11] 3,957,525

[45] May 18, 1976

[54] ROAD SURFACING MATERIALS

[75] Inventors: Geoffrey Lees, Stratford-upon-Avon; Arthur Roger Williams, Birmingham, both of England

[73] Assignee: Dunlop Limited, London, England

[22] Filed: Mar. 11, 1974

[21] Appl. No.: 449,759

Related U.S. Application Data

[63] Continuation of Ser. No. 245,159, April 18, 1972, abandoned.

[30]     Foreign Application Priority Data

Apr. 24, 1971   United Kingdom............... 11237/71
Nov. 16, 1971   United Kingdom............... 53096/71

[52] U.S. Cl. .......................... 106/288 B; 106/281 R
[51] Int. Cl.²......................................... C08H 17/04
[58] Field of Search .................... 106/288 B, 281 R; 404/19, 20

[56]             References Cited
              UNITED STATES PATENTS

| 1,779,955 | 10/1930 | Young | 404/20 |
|---|---|---|---|
| 3,081,186 | 3/1963 | Burns | 106/308 Q |
| 3,811,905 | 5/1974 | Kroyer | 106/288 B |

*Primary Examiner*—Winston A. Douglas
*Assistant Examiner*—J. V. Howard
*Attorney, Agent, or Firm*—Stevens, Davis, Miller & Mosher

[57]              ABSTRACT

A road surfacing material consisting of binder and aggregate. The aggregate used is a blend of materials having differing rates of wear, each having a surface micro-texture in the range defined by asperity heights of a minimum texture depth of 5 microns and maximum texture depth of 500 microns.

5 Claims, 3 Drawing Figures

ROAD SURFACING MATERIALS

This is a continuation of application Ser. No. 245,159, filed Apr. 18, 1972, now abandoned.

This invention relates to road surfacing materials and in particular to a bituminous or concrete road surfacing material.

Concrete and bituminous road surfacing materials consist of an aggregate and a binder composition which in the case of concrete is based on Portland cement and in the case of a bituminous composition is bitumen, tar or lake-asphalt, or sometimes a combination of these binders. The aggregate consists of small pieces of stone of various sizes up to about 1½ inches.

In the running of a tire over a road surface the interaction between the road surface and the tire enables the tire to be braked, accelerated and steered. Under wet conditions the water acts as a lubricant and it is necessary for the tire to break through the film of water on the surface to achieve an adequate grip. The grip achieved in a particular case depends upon the efficiency of the interacting road surface and tire in removing the water from the tire contact area and in achieving some contact between the road surface and actual tire rubber.

The contribution of the road surface to this interaction is dependent upon two factors, its macro-texture, meaning its texture when considering the spacial arrangement of the aggregate pieces and the binder, and its micro-texture, meaning its texture when considering the actual surface texture of the individual pieces of aggregate. An open macro-texture is desirable to enable water to run away or be forced away from a particular area through the open texture material. A micro-texture which is sharp enough to give good grip when in contact with the tire rubber is also desirable. The present invention is concerned with road surfacing materials in which these factors are improved.

According to the invention a road surfacing material is provided in which the aggregate comprises a blend of at least two aggregate materials which have different rates of wear as judged by the aggregate test B.S. 812 1967 and in which each aggregate has a surface micro-texture in the range defined by asperity heights of a minimum texture depth of 5 microns and a maximum texture depth of 500 microns. This surfacing material may be initially provided with an open macro-texture and will then tend to maintain this texture during wear owing to the incorporation of the aggregate materials of different wear rates. The result of this is that the removal by traffic action of the faster wearing aggregate leaves the slower-wearing aggregate standing proud on the surface.

A three dimensional mathematical representation of the micro-texture is not possible at present, however, a photo micrograph of an example of an aggregate with a suitable micro-texture is shown in FIG. 1 (the magnification is × 2100). An idealized surface micro-texture would contain cones of half-angle between 30° and 75° of a height between 5 microns and 500 microns and having a continuous close-packing arrangement.

The surfacing material of this invention has a satisfactory wet-grip performance consistent with a minimized abrasive effect on the tire rubber. The rate of tire tread abrasion is a function of the severity of the shear forces generated between the tire and the road surface which are greatest during cornering, braking and acceleration.

As the level of micro-texture of the aggregate increases from that of the polished state towards a texture depth of 5 to 500 microns the wet skid resistance of a road surface using the aggregate improves. Compared with a surface of polished aggregate the rate of tire abrasion for a given tire and manoeuver also increases with increasing micro-texture depth, the rate of tire abrasion being a function of the severity of the shear forces generated between the tire and the aggregate.

Aggregates with a micro-texture greater than the range specified in this invention may possess a high wet skid resistance on road or runways, but also tend to cause excessive tread abrasion e.g. abrasion on such a surface can be as high as ten times that on a low micro-textured surface.

Examples of aggregates having a micro-texture in the desired range are Haughmond gritstone (Pre-Cambrian of Shropshire) and certain other Pre-Cambrian and Palaeozoic gritstones including certain types of Millstone Grit.

The polishing of the aggregate which normally occurs under traffic tends to lower the micro-texture of the aggregate particles thus reducing their wet-grip capability.

Thus in the blend of aggregates of different wear rates described above it is necessary for most applications for the aggregates having the lower wear rate to have a high resistance to polishing and advantageous if the aggregate of high wear rate also has a high resistance to polishing. By an aggregate of high resistance to polishing is meant an aggregate of a type which retains a surface micro-texture in the desired range when subject to traffic action preferably over the life of the road surface. This may be achieved with a friable aggregate as e.g. in gritstone where loss of quartz particles from the cementing matrix during wear results in fresh unpolished surface repeatedly being exposed, the surface micro-texture thus remaining substantially unchanged. Alternatively the aggregate may be a hard material whose surface wears away at a negligable rate, such materials being suitable only as the aggregate of the lower wear rate in the road surfacing material of this invention.

When using the mixture of aggregates the preservation of the open macro-structure containing the void channels necessary for sub-tire drainage may suitably be achieved by blending aggregates so that the constituent with the high rate of wear comprises the middle sizes of the aggregate grading.

The maximum size of aggregate particles in a wearing course material will generally not exceed 1½ inches. The middle sizes will therefore include material within the range of ½ inch to No. 7 British Standard (B.S. 410) sieves or their metric counterparts. The assessment of difference in rate of wear may be by the Aggregate abrasion test BS 812 or by the Los Angeles abrasion test ASTM C.131 which gives results which can be correlated with the British Standard test. In this specification material passing through a sieve size No. 200 is the minimum size material to which the term aggregate is applied. Preferably the faster wearing aggregate wears at a rate at least 1.3 times faster than the other.

Figure 1:
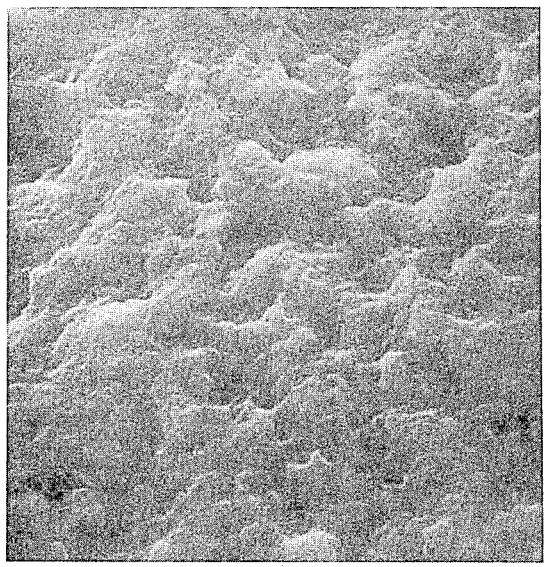
FIG. 1 is a photo-micrograph of an aggregate with a suitable micro-texture. The magnification is × 2100.

Various aspects of the invention will now be explained in more detail by means of an Example.

EXAMPLE

A continuous grading of blended aggregates for the invention is given below in Table I.

TABLE I

| B.S. Sieve size | % (w/w) passing | % (w/w) | of size in range | aggregate type retained |
|---|---|---|---|---|
| 3/4 inch | 100 | 4 | (3/4" to 1/2") | A |
| 1/2 inch | 96 | 6 | (1/2" to 3/8") | A |
| 3/8 inch | 90 | 11.2 | (3/8" to 1/4") | A |
| 1/4 inch | 78.8 | 21.4 | (1/4" to 3/16") | B |
| 3/16 inch | 57.4 | 21 | (3/16" to 7 ) | B |
| No. 7 | 36.4 | 28 | ( 7 to 200) | A |
| No. 200 | 8.4 | 8.4 | (passing 200) | A |

In this blend aggregate A is an aggregate of low wear rate (Aggregate abrasion value 2.7) and aggregate B is an aggregate of high wear rate (Aggregate abrasion value 5.0). It can be seen that aggregate B comprised 42.4 percent of the total blend; 21.2 percent of the blend was aggregate A in larger sizes than aggregate B and 36.4 percent of the blend was aggregate A in smaller sizes than aggregate B.

The components A and B of the mix may for example both be gritstones from the same quarry but from different seams, both having the desired micro-texture but A being more wear resistant than B.

These proportions of the blend can be varied according to the site depending upon the site requirements for high speed or low speed skid resistance and depending upon highway gradient and crossfall. For low speed conditions, and sites with good drainage due to high gradients, only slight contribution to drainage by an open texture is required therefore only a small percentage of the faster wearing aggregate is required. For high speed sites and sites with poor drainage a greater proportion of the faster wearing aggregate is required to encourage development of the desirable macro-texture and hence adequate drainage at the tire/road interface. For the latter sites the use of this open macro-textured surface will also considerably reduce the 'spray' hazard from throwing up of water by the tires of vehicles.

It should be noted that while the continuous graded blend described by way of example above is preferable the aggregates of different wear rates in this invention may be mixed in any desired proportion or size range distribution.

In the road surfacing materials of this invention may be used all binder contents and binder types and all cement contents and cement types which are used for road surfacing materials.

The aggregate mixture design specified in Table I in the Example above has been shown to produce less road noise in comparison with a BS 594 standard surface, sufficient to increase passenger comfort. Table II gives details of the comparison between these surfaces.

TABLE II

| Vibration / Noise | Relative Performance of surface produced as above compared with BS 594 (hot rolled asphalt) |
|---|---|
| Vibration (vertical on passenger seat runner | |
| 20 kph | improved |
| 50 kph | improved |
| Vibration (longitudinal) on passenger seat runner | |
| 20 kph | similar |
| 50 kph | similar |
| Center of passenger compartment | |
| 20 kph | significantly improved |
| 50 kph | similar |
| Unsprung mass (measured just behind stub-axle on n/s front) (vertical) | |
| 20 kph | significantly improved |
| 50 kph | significantly improved |
| Unsprung mass (longitudinal) | |
| 20 kph | significantly improved |
| 50 kph | significantly improved |

The car on which the measurements were carried out was a Fiat 124 Special T using sizes 155-13 textile radial ply tires inflated to 24 p.s.i. The aggregates A and B were both gritstones.

The general conclusion from the tests was that the surfacing material produced in accordance with this invention gave rise to less vibration and noise in the vehicle than the standard surface, especially at lower speeds.

Tests have also been carried out to compare the friction and wear induced by surfaces in accordance with this invention with those induced by other road surfacing materials.

The surfaces compared were a) a surface prepared from calcined bauxite particles, nominally ⅛ inch diameter stuck down in a resin matrix, b) an asphalt surface using the aggregate mix of Table I above in which A and B were gritstones and a binder content of about 4.7 per cent, c) a surface prepared from Bridport Pebble, the pebbles being nominally ⅜ inch diameter stuck down in a cement/mortar matrix.

The calcined bauxite had a level of surface microtexture just above the 500 micron maximum specified previously, the asphalt surface had a micro-texture in the middle of the 5 to 500 micron range and the Bridport Pebble had a micro-texture below the 5 micron level.

Figure 2:
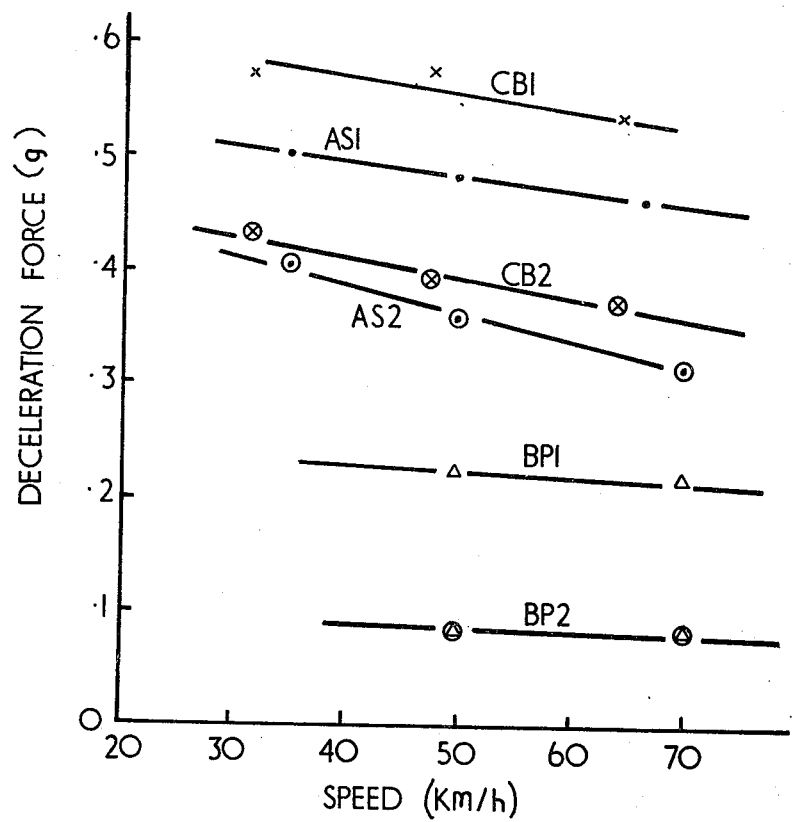
FIG. 2 is a graph showing the wet peak friction and locked wheel friction obtained using a textile radial ply tire.

The accompanying FIG. 2 is a graph showing the wet peak friction and locked wheel friction obtained using a textile radial ply tire on these surfaces.

Plots CB 1 and CB 2 are the plots obtained for calcined bauxite.

Plots AS 1 and AS 2 are the plots obtained for the asphalt which although not as high as the calcined bauxite, are of the same order.

Plots BP 1 and BP 2 show that Bridport Pebble is unsatisfactory and gives very much less grip than the other surfaces.

Figure 3:
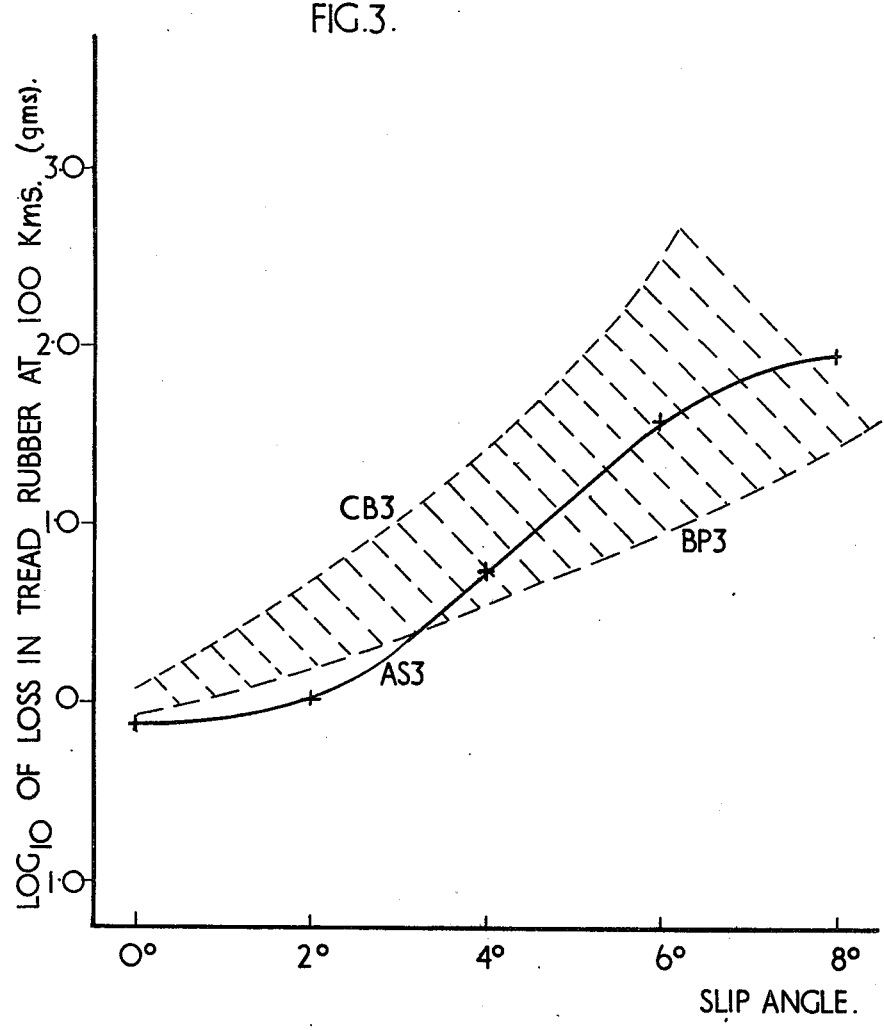
FIG. 3 is a graph showing the rate of abrasion loss of rubber from a plain tread cross ply tire on the three surfacing materials at various tire slip angles measured on a variable speed internal drum test machine.

The accompanying FIG. 3 is a graph showing the rate of abrasion loss of rubber from a plain tread cross ply tire on the three surfacing materials at various tire slip angles measured on a variable speed internal drum test machine. Curve CB 3 is the curve produced by calcined bauxite, AS 3 that for the asphalt in accordance with this invention and BP 3 that for Bridport Pebble. These curves show that in this respect the asphalt of the invention causes appreciably less wear than the calcined bauxite although slightly more than Bridport Pebble.

It is to be appreciated that although reference has been made to roads in this specification the materials described may be used also for surfacing airport runways and similar purposes.

Having now described our invention, what we claim is:

1. A road surfacing material comprising a blend of at least two aggregates of graded sizes up to not more than 1½ inches disposed in a binder matrix and having different rates of wear as judged by the aggregate test BS 812 1967, the particles of each of said two aggregates exposed to the surface falling within different size ranges, the slower wearing aggregate comprising one portion of particles of larger size and another portion of particles of smaller size than any of the particles of the faster wearing aggregate.

2. A road surfacing material according to claim 1 in which the aggregates are blended so that the constituent with the higher rate of wear comprises the middle sizes of the aggregate grading.

3. A road surfacing material according to claim 1 in which the faster wearing aggregate is a gritstond.

4. A road surfacing material according to claim 1 in which the surface micro-structure of at least some of said aggregate approximates to an idealized micro-texture containing cones of half-angle between 30° and 75° of height between 5 microns and 500 microns and arranged in a continuous close-packing arrangement.

5. A road surfacing material according to claim 1 in which the faster wearing aggregate wears at a rate at least 1.3 times faster than the other.

* * * * *